UNITED STATES PATENT OFFICE.

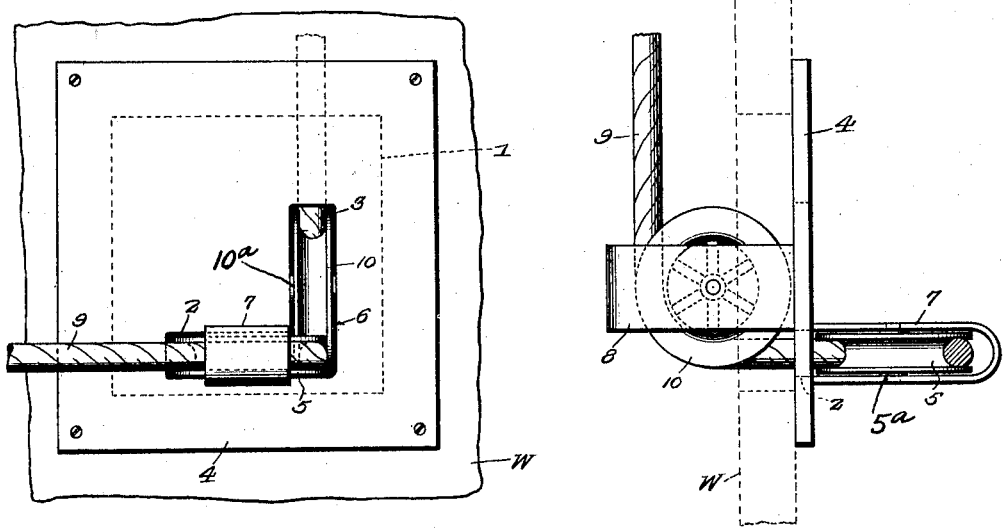
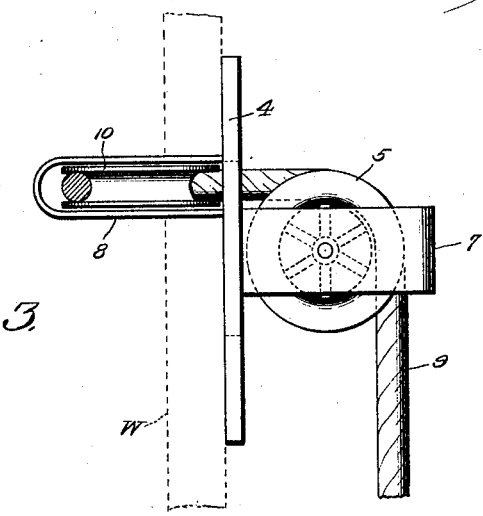

AUGUST HEIL, OF HANCOCK, MINNESOTA.

TWO-WAY PULLEY.

1,400,435. Specification of Letters Patent. Patented Dec. 13, 1921.

Application filed June 7, 1921. Serial No. 475,666.

*To all whom it may concern:*

Be it known that I, AUGUST HEIL, a citizen of the United States, residing at Hancock, in the county of Stevens and State of Minnesota, have invented certain new and useful Improvements in a Two-Way Pulley, of which the following is a specification.

This invention relates to pulleys, and more particularly to two-way pulleys.

The object of the invention is to provide a pulley of this character especially designed for use on a hay barn or similar structure and which is so constructed that one pulley will be mounted on the outer face of one wall of the building and the other on its inner face, said pulleys being mounted in planes at right angles to each other with the peripheries thereof positioned in close proximity to slot-like openings arranged at right angles in a plate positioned over an opening in the building wall.

Another object is to provide simple and efficient means for mounting pulleys of this character and to provide them with suitable guards which are carried by the plate referred to above.

With these and other objects in view, the invention consists in certain novel features of construction as hereinafter shown and described and then specifically pointed out in the claims, and in the drawings illustrative of the preferred embodiment of the invention.

In the accompanying drawings:—

Figure 1 represents a front elevation of a portion of a building wall with this improved pulley shown applied.

Fig. 2 is a side view of the pulley with the wall in dotted lines, and

Fig. 3 is a top plan view thereof.

In the embodiment illustrated the pulley constituting this invention is shown mounted on an upright wall W which may be that of a hay barn or other structure and which is equipped with an opening 1 having a metal plate 4 arranged thereover and provided with a right angularly disposed slot-like opening adjacent the arms 2 and 3 of which the peripheries of two pulleys 5 and 10 are designed to be mounted, one facing inward and the other facing outward. (See Fig. 3.)

These pulleys 5 and 10 may be of any desired size being preferably about five inches in diameter, more or less, and may be composed of any suitable material preferably of cast iron. The pulley 5 which is here shown mounted on the outer face of the building wall W is disposed in horizontal position with its periphery arranged opposite and adjacent the opening 2 in the plate 4.

The metal plate 4 which is mounted on the outer face of the wall W over the opening 1 therein, is secured to said wall by bolts, screws or the like and has an angular opening 6 therein registering with the opening 1 in the wall W.

Combined U-shaped pulley supports and guards, 7 and 8 extend one from one face of plate 4 and one from the other face thereof spanning the branch slots 2 and 3 in said plate. One of these members is positioned on the outer face of the wall W while the other extends through the opening therein and projects beyond the inner face thereof as is shown in Fig. 3.

Pulley 5 is journaled in the legs of member 7 and pulley 10 in those of member 8, sufficient space being provided for the passage of the cable 9 which is trained around the pulleys 5 and 10 in any desired manner, one way being shown herein. This cable is connected at one end with a suitable source of power and its other end with the load to be lifted.

These U-shaped guards 7 and 8 straddle the pulleys 5 and 10 as above described and are so constructed and positioned as to provide sufficient space between the cross bars thereof and the peripheries of the pulleys to permit the free passage of the cable 9 without contacting with the guard and yet operate to prevent all possibility of the cable jumping the pulley, it of course being understood that both of these pulleys 5 and 10 have grooved peripheries to receive the cable as is shown in the drawings.

The pulley 10 is shown mounted on the inner face of the wall W and is positioned vertically while pulley 5 on its outer face is positioned horizontally in a plane at right angles to pulley 10. The pulleys 9 and 10 are mounted respectively in the guards 7 and 8, and are journaled in the opposed legs of said guards by means of pintles $5^a$ and $10^a$ respectively.

In the use of this two-way pulley the sheave or pulley 5 is mounted as shown in the drawings on the outer face of the wall W in a horizontal plane while the sheave 10 is mounted on the inner face of said wall in a vertical plane. The periphery of the pulley 10 at the lower portion thereof is substantially in alinement with that of pulley or sheave 5 at its inner portion so that when the cable 9 is trained around these pulleys and extended through the branch slots 2 and 3 in the plate 4 and through the opening in wall W it will assume the position shown in the drawing, said cable leading from a suitable source of power around sheave 5 through the lower end of slot 3 around pulley 10 at the rear thereof and upward as shown in Fig. 2. One method only of training the cable 9 is herein shown, but obviously it may be trained in many different ways, hence the provision of the slots 2 and 3 which extend at opposite ends beyond the perimeters of the sheaves or pulleys a sufficient distance to provide for the passage of the cable.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:—

1. The combination with a supporting wall having an opening therein, a plate secured over said opening and having slots arranged in planes at right angles to each other with their inner ends intersecting; combined guards and supports carried by said plate at opposite sides of said slots, one guard on one face of said plate and the other on its opposed face and sheaves journaled in said supports with their peripheries extending adjacent said slots.

2. The combination of a supporting wall having an opening therein, a plate secured over said opening and having slots arranged in planes at right angles to each other with their inner ends adjacent; laterally extending supports carried by opposed faces of said plate at opposite sides of said slots, sheaves journaled in said supports with their peripheries extending adjacent said slots, said supports being U-shaped and straddling said sheaves with a pintle extending through the legs of each of said supports and centrally through the pulley thereby rotatably mounting the pulley, the crossbars of said U-shaped members forming guards for the pulleys or sheaves.

3. The combination of a supporting wall having an opening therein, a plate secured over said opening and having slots arranged in planes at right angles to each other with their inner ends adjacent; U-shaped brackets secured to said plate at opposite sides of said slots one on one face of said plate and one on the other, a pulley journaled in each of said brackets and having a grooved perimeter extending adjacent the slot over which the bracket is located, the ends of each slot extending beyond the perimeter of the pulley to provide for the passage of the cable to be trained thereover.

In testimony whereof, I affix my signature hereto.

AUG. HEIL.